United States Patent
Nusier et al.

(10) Patent No.: US 8,439,432 B2
(45) Date of Patent: May 14, 2013

(54) ROOF STRUCTURE FOR A VEHICLE WITH NO CENTER PILLAR

(75) Inventors: Saied Nusier, Canton, MI (US); Mohamed Ridha Baccouche, Ann Arbor, MI (US); Jamel E. Belwafa, Ann Arbor, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/235,540

(22) Filed: Sep. 19, 2011

(65) Prior Publication Data
US 2013/0069395 A1    Mar. 21, 2013

(51) Int. Cl.
*B62D 25/06*    (2006.01)

(52) U.S. Cl.
USPC .................. 296/210; 296/30; 296/193.06

(58) Field of Classification Search ............. 296/205, 296/29, 30, 203.03, 203.04, 193.05–193.06, 296/193.08; 403/191, 217, 218
See application file for complete search history.

(56) References Cited

U.S. PATENT DOCUMENTS

| | | | | |
|---|---|---|---|---|
| 3,021,159 A | * | 2/1962 | Back | 403/191 |
| 4,355,844 A | * | 10/1982 | Fantini Muzzarelli | 296/205 |
| 4,660,345 A | * | 4/1987 | Browning | 52/653.2 |
| 5,848,853 A | * | 12/1998 | Clenet | 403/272 |
| 6,582,010 B2 | * | 6/2003 | Sakyo et al. | 296/190.08 |
| 7,503,623 B2 | * | 3/2009 | Favaretto | 296/203.01 |
| 2002/0195840 A1 | | 12/2002 | Mishima et al. | |
| 2010/0237661 A1 | * | 9/2010 | Baccouche et al. | 296/210 |

FOREIGN PATENT DOCUMENTS

| | | |
|---|---|---|
| JP | 58183359 A | 10/1983 |
| JP | 2004142683 A | 5/2004 |
| JP | 2004142685 A | 5/2004 |
| JP | 2004148877 A | 5/2004 |
| KR | 20030048930 A | 6/2003 |

\* cited by examiner

*Primary Examiner* — Dennis Pedder
(74) *Attorney, Agent, or Firm* — Jason Rogers; Brooks Kushman P.C.

(57) ABSTRACT

A vehicle roof system enabling elimination of the B-pillar is disclosed. A particular aspect of the invention is to transfer vertical roof loads onto an enhanced rear structure of the vehicle. An additional aspect of the invention is to employ a rear upper cap reinforcement to directly assume roof crush loads applied at front of the vehicle during testing. A specific load transfer mechanism is disclosed. Vertical roof crush force applied near the front of the vehicle is transferred into both a torsional load upon a rear header of the vehicle, and a bending moment upon the C-pillar of the vehicle.

19 Claims, 4 Drawing Sheets

ROOF STRUCTURE FOR A VEHICLE WITH NO CENTER PILLAR

TECHNICAL FIELD

The invention relates to the roof structure of a vehicle body.

BACKGROUND

Vehicle safety standards have evolved in an effort to provide safer passenger cars. A vehicle safety standard for roof crush resistance is FMVSS No. 216. The loading requirements of FMVSS No. 216 have been increased with the objective of providing greater protection for passengers in vehicle rollover events. The standard will require that vehicles meet a roof strength requirement of 3.0 times the vehicle weight. This requirement increase poses a significant challenge to vehicle manufacturers. Increased roof strength requirements must be met while also achieving increased fuel economy that may demand lighter weight and less structure.

Large passenger vehicles often have three or more sets of vertical pillars supporting a roof structure. Pillars are typically referred to from front to rear, as A, B, and C-pillars. Some vehicles also employ a fourth, D-pillar. In contrast, some small vehicles with only one row of doors have only two pillars. Vehicles with front and rear side doors generally have a middle B-pillar. The B-pillar defines the separation between separate front and rear door openings. Existing roof structures rely substantially on a mid-vehicle vertical B-pillar, to sustain vertical roof crush loads. The size of the pillar required to meet roof crush requirements may obstruct access to the vehicle by occupants. It generally restricts the space available for door openings, and therefore the ease of entry and exit by occupants of the vehicle. The B-pillar also limits the size of objects that are capable of being loaded through the door openings. The B-pillar may also obstruct the driver's field of view. The B-Pillar also presents vehicle styling limitations, since its placement is often dictated by functional requirements. It would be advantageous to design a vehicle body with no B-pillar, offering several customer space advantages, yet still meeting increased roof strength requirements.

SUMMARY

Vehicle designs may benefit from the elimination of the B-pillar and increasing the size of the side openings. The increased opening size makes it easier for passengers to enter and exit the vehicle. Larger objects may be loaded into the vehicle for transport. Further, there is more styling flexibility on the side appearance of a vehicle, stemming from not having to design around a substantial B-pillar structure. Finally, there are weight savings and fuel economy improvement opportunities that may be achieved by the elimination of parts. Although other parts of the body structure require enhancement to meet the structural requirements, there is a net weight savings opportunity to be realized.

The problem solved is achieving vehicle body strength requirements while realizing the benefits of eliminating a center pillar structure. By utilizing a strategy of transferring vertical loads applied in the front of the vehicle onto an enhanced rear body structure, a large four door vehicle may be obtained with no B-pillar. The rear structure is enhanced by reconfiguring key portions to directly interface with a roof loading apparatus, by coupling several tubular reinforcing members together to behave as a homogenous structure, and/ or by targeting transferred roof loads into torsion and bending moments on specific parts.

DETAILED DESCRIPTION

Detailed embodiments are disclosed that constitute examples of the present invention that may also be embodied in various and alternative forms. The figures are not necessarily to scale and some features may be exaggerated or minimized to show details of particular components. Specific structural and functional details disclosed are not to be interpreted as limiting, but merely as a representative basis for teaching one skilled in the art to practice the present invention.

Figure 1:
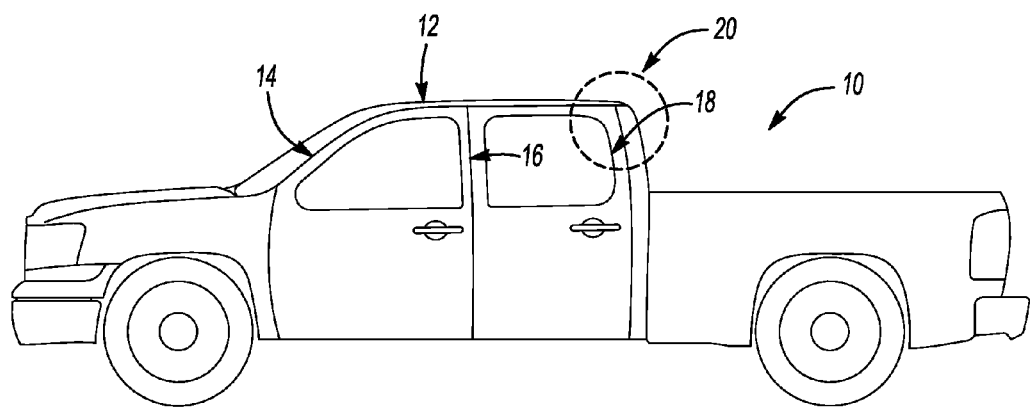
FIG. 1 is a side elevation view of an exterior of a vehicle.

FIG. 1 is diagram of an exterior view of a vehicle 10 having a roof 12. The vehicle has an A-pillar 14, a B-pillar 16, and a C-pillar 18, all vertically supporting the roof 12. The area of focus of the disclosed embodiment is region 20 near the C-pillar.

Figure 2:
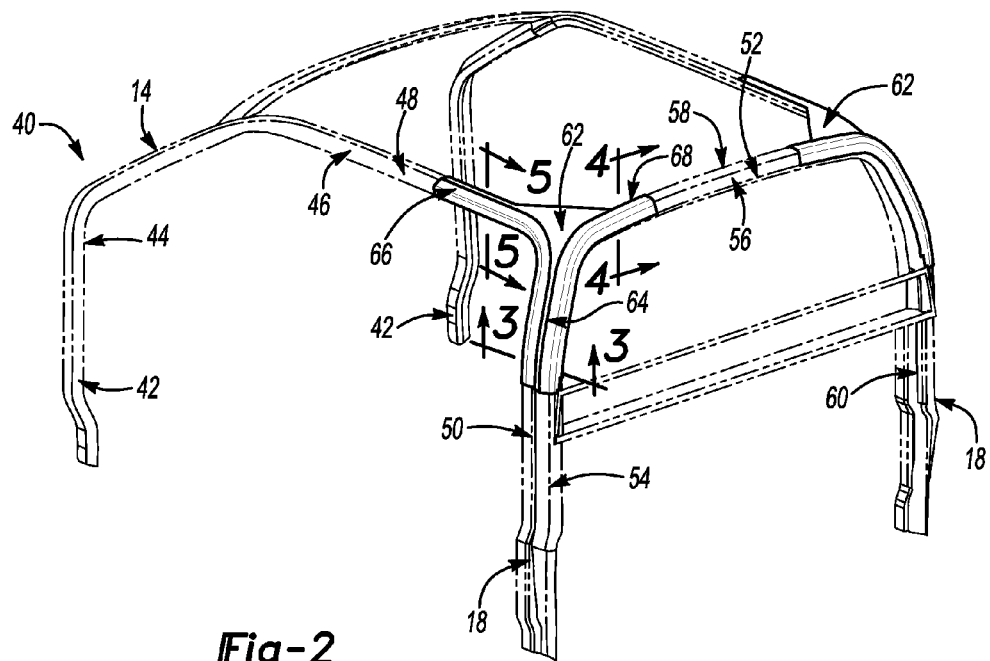
FIG. 2 is a rear isometric view of an upper body sub-structure.

FIG. 2 is an isometric view of an upper body reinforcement sub-structure, generally indicated by reference numeral 40. The outer surfaces of the vehicle are not shown to demonstrate that the only vertical supporting structure for the roof is located at the A-pillar 14 and C-pillar 18. Continuous side tubular reinforcements 42 each have an arch-like shape with three sections. A first section 44 extends vertically at the front of the vehicle supporting the A-pillar 14. A second section 46 extends transversely along the side of the roof 12, and comprises a portion of a side roof rail 48. A third section 50 extends vertically at the rear of the vehicle supporting the C-pillar 18. A rear tubular reinforcement 52 has a continuous arch-like shape with three sections. A first rear section 54 extends vertically on one side supporting the C-pillar 18. A second rear section 56 extends transversely along the rear edge of the roof 12, and comprises a portion of a rear header 58. A third rear section 60 extends vertically supporting the opposing C-pillar 18. The third sections 50 of each of the side tubular reinforcements 42, are coupled to each of the vertical first rear section 54 and third rear section 60 of the rear tubular reinforcement 52. The tubular reinforcements are coupled by mated outer surfaces and are welded together.

Region 20, as shown in FIG. 1, is provided with an upper cap 62 on each of the right and left sides of vehicle 12. The upper caps 62 have three extended receptacles that receive supporting parts. Referring to FIG. 2, a first receptacle 64 receives the pieces of the vertical C-Pillar 18. A second receptacle 66 receives the second longitudinal section 46 of the side tubular reinforcement 42. A third receptacle 68 receives the transverse second rear section 56 of the rear tubular reinforcement 52. The upper caps 62 may be attached to supporting parts at the receptacles by welding, adhesive bonding, or mechanical fasteners.

Figure 3:
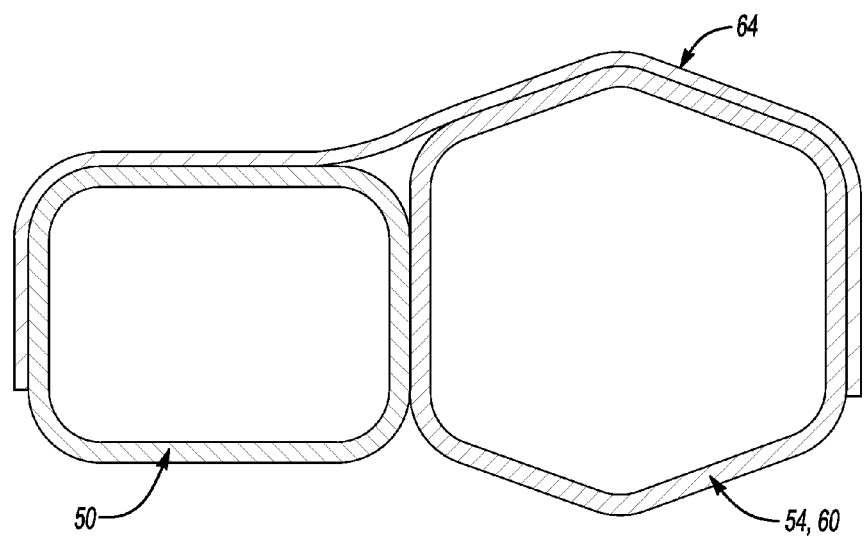
FIG. 3 is a cross-sectional view along line 3-3 in FIG. 2.

FIG. 3 is a diagram of a cross sectional view 3-3 from FIG. 2. This portion represents the sub-structure of the C-pillar 18. This view shows a structural mating condition of the upper cap, the side tubular reinforcement, and the rear tubular reinforcement. As discussed above, the third section of the side tubular reinforcement 50 is joined to a vertical section of the rear tubular reinforcement 52. On one side of the vehicle the first rear section 54 of the rear tubular reinforcement 52 is joined to the third section 50 of the side tubular reinforcement 42. On the opposing side, the third rear section 56 joins to the third section 60 of the alternate side tubular reinforcement 42. The first receptacle portion of the upper cap 64 joins to outer surfaces of the vertical sections of both tubular reinforcements.

Figure 4:
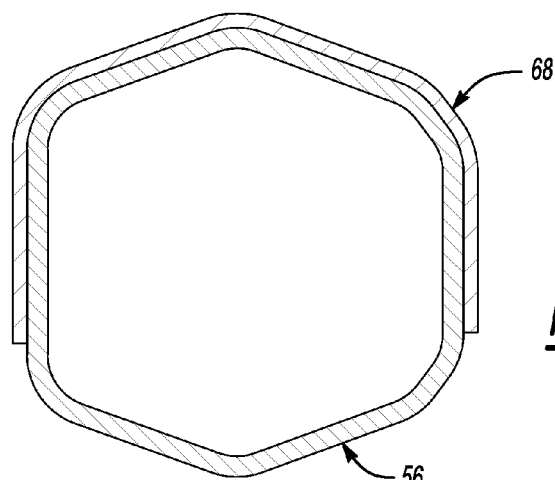
FIG. 4 is a cross-sectional view along line 4-4 in FIG. 2.

FIG. 4 is a diagram of a cross sectional view 4-4 from FIG. 2. This portion of sub-structure 40 represents the rear header 58. Here, a structural mating condition between the third receptacle of the upper cap 68 and the second section 56 of the rear tubular reinforcement 52 is shown. The upper cap is joined to the outer surfaces of the tubular reinforcement.

Figure 5:
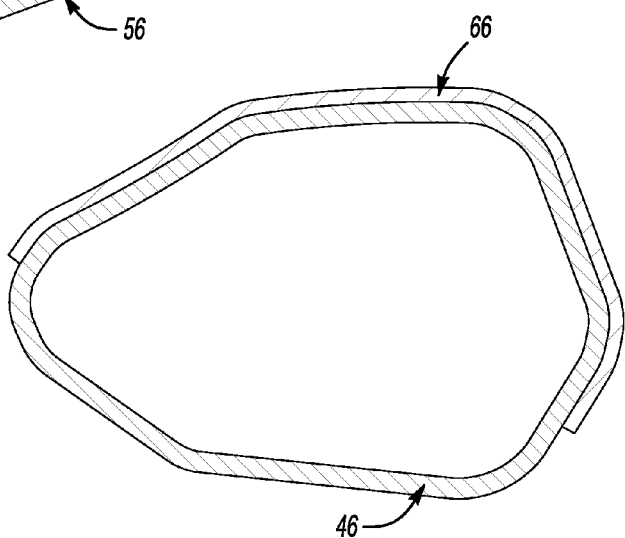
FIG. 5 is a cross-sectional view along line 5-5 in FIG. 2.

FIG. 5 is a diagram of a cross sectional view 5-5 from FIG. 2. This portion of the sub-structure 40 represents the roof side rail 48. There is a structural mating condition between the second receptacle of the upper cap 66 and the second side section 46 of the side tubular reinforcement.

The above mentioned aspects of this disclosure are applicable to many vehicle types with no B-pillar. Cap reinforcements 62 are particularly effective in cooperation with tubular sub-structure reinforcements. Hydro-forming is used at times in automotive vehicle construction for several reasons. Hydro-formed tubes may be manufactured in more flexible shapes than are practical with stamped parts. Hydro-formed tubes also tend to have increased section strength properties as compared to stamped and assembled cross sections of the same dimensions related to the continuity of the tubular cross sections. This strength advantage yields the ability to have smaller cross sections with equivalent properties further enabling weight savings. The cost to manufacture hydro-formed tubes with varying shapes is generally less than a multi-piece stamped assembly. Accordingly, the vertical rear C-pillar 18 comprised of at least two tubular structures has higher strength properties than a stamped, assembled structure of the same size.

The upper cap 62 functions well as a joining mechanism for multiple hydro-formed tube structures. When tube structures are configured with continuous arch-like shapes the load transfer paths are different as compared to a stamped and assembled structure. The tubular parts may be joined by welding, adhesive bonding, or mechanical fastening. The joining mechanism between the tube structures may become stressed upon loading, and the parts may separate and behave independently. The upper cap 62 may serve as an effective way to integrate the side and rear tube structures to obtain behavior more like a single continuous structure. There are particular advantages to this continuity when attempting to manage and direct loads to targeted areas. The upper caps 62 disclosed herein may operate as an efficient method of coupling multiple tube structures with high strength integrity at the joints.

The most rigorous loads encountered by a vehicle roof 12 tend to occur during a vehicle rollover event. Federal Motor Vehicle Safety Standard (FMVSS) No. 216 is intended to simulate loads that occur when a vehicle roof 12 strikes the ground during a rollover event. The standard requires minimum roof strength as a ratio of vehicle weight. Additionally, Insurance Institute of Highway Safety (IIHS) publishes its own more stringent roof strength requirement. While not mandatory, the latter requirement is highly influential in customer decisions, and beneficial for manufacturers to have a high rating. Both tests are performed with essentially the same procedure, but demand different performance levels.

Figure 6:
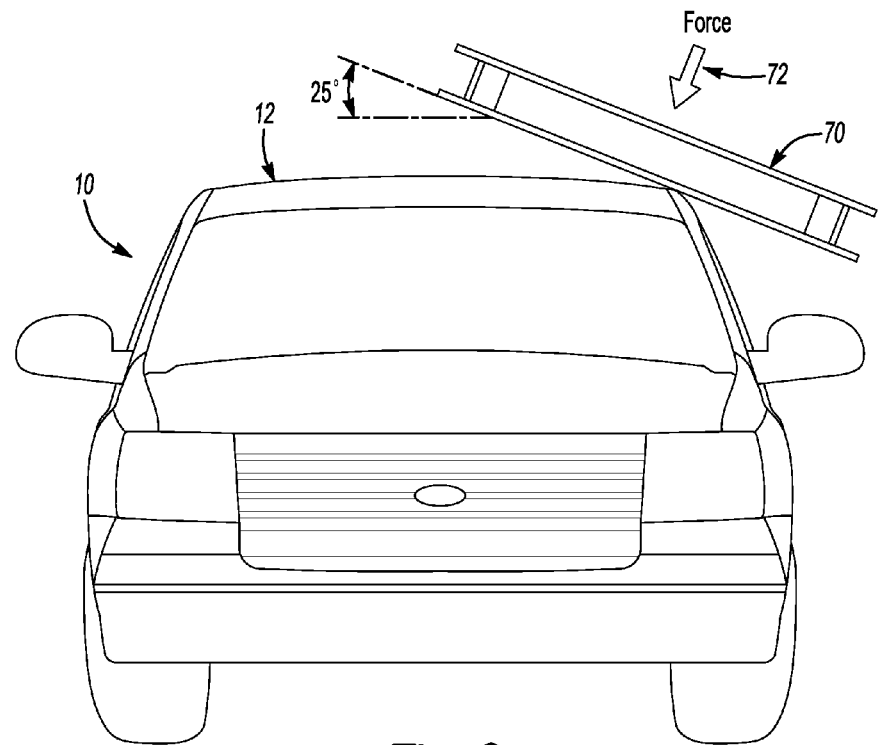
FIG. 6 is a diagrammatic front elevation view of a standard roof strength test fixture.

FIG. 6 is a diagram of a frontal view of a standard roof strength test fixture. A large steel plate 70 of a test fixture having prescribed dimensions and orientation is placed in contact with one side of the roof 12 of the vehicle 10. During a roof strength test, the steel plate 70 is pressed downward along the prescribed angle. The test fixture applies a steadily increasing force, indicated by arrow 72, as the steel plate 70 travels. This simulates contact of the roof 12 with the ground during a vehicle rollover event. Test standards may require that a force as high as 4.0 times the unloaded weight of the vehicle must be achieved before the steel plate 70 travels 5 inches (127 millimeters) from the point of initial contact. Withstanding loads approaching 30,000 pounds (133,446 newtons) may be required depending on vehicle weight.

Figure 7:
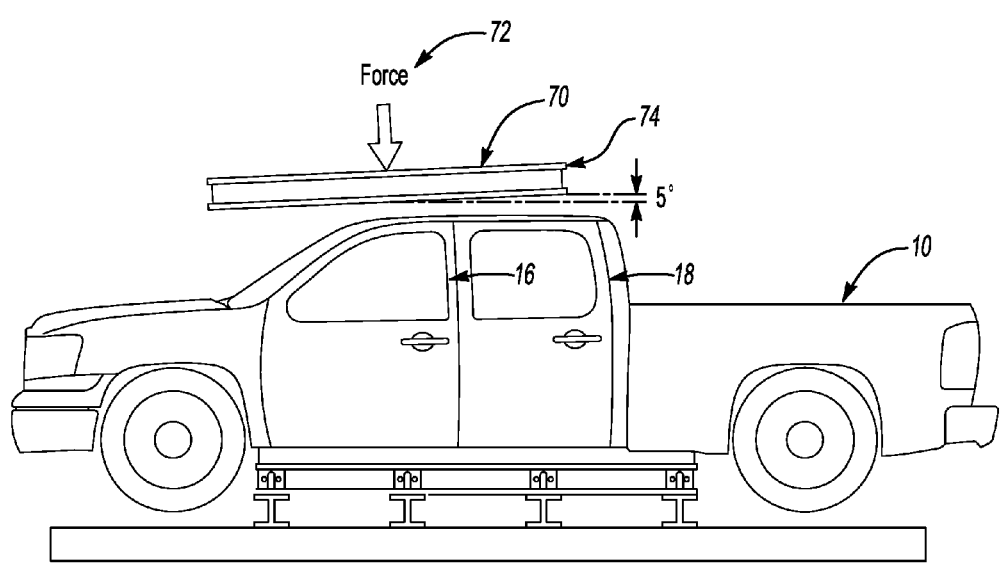
FIG. 7 is a diagrammatic side elevation view of a standard roof strength test fixture.

FIG. 7 is a diagram of a side view of the standard roof strength test fixture. The location of a rearmost edge 74 of the steel plate 70 in relation to the full vehicle 10 may be estimated based on test setup protocol. The resultant position of the rearmost edge 74 of the steel plate 70 is an intermediate location between the B-Pillar 16 and the C-Pillar 18 for larger vehicles.

The rear portion of the body structure may be used to provide stiffness resistant to roof crush loads. Loads applied at the forward part of the roof near the windshield generally do not receive resistance from the rear portion of the vehicle. The center structure commonly assumes a large portion of the strength requirement through column loading on vehicles with a B-pillar. It is desirable to eliminate the B-pillar from a vehicle because of the advantages outlined above. However, a load management strategy is required to meet structural demands.

The rear structure may be engaged in several ways as the forward portion of the roof structure is loaded. The upper cap 62 extends forward in vehicle to make direct contact with the steel plate of a test fixture. This direct contact improves test performance by providing load resistance earlier in a roof strength test. Substructure parts may be configured to overlap and make direct contact with the steel plate at a predicted boundary of the test fixture outlined in test protocols.

Referring both to FIG. 2 and FIG. 7, the second extended receptacle 66 of the upper cap 62 extends forward along the side roof rail 48 sufficiently to engage and resist travel of the steel plate 70 during roof strength testing. Vertical roof loads are transferred onto the rear structure during a roof strength test. The configuration of the three receptacles, including the extension of the forward receptacle 66, facilitates this load transfer strategy. The sooner that the rear structure engages in load resistance, there is more time available for energy absorption. This leads to better allowance of resistance forces to build to the required levels.

Figure 8:
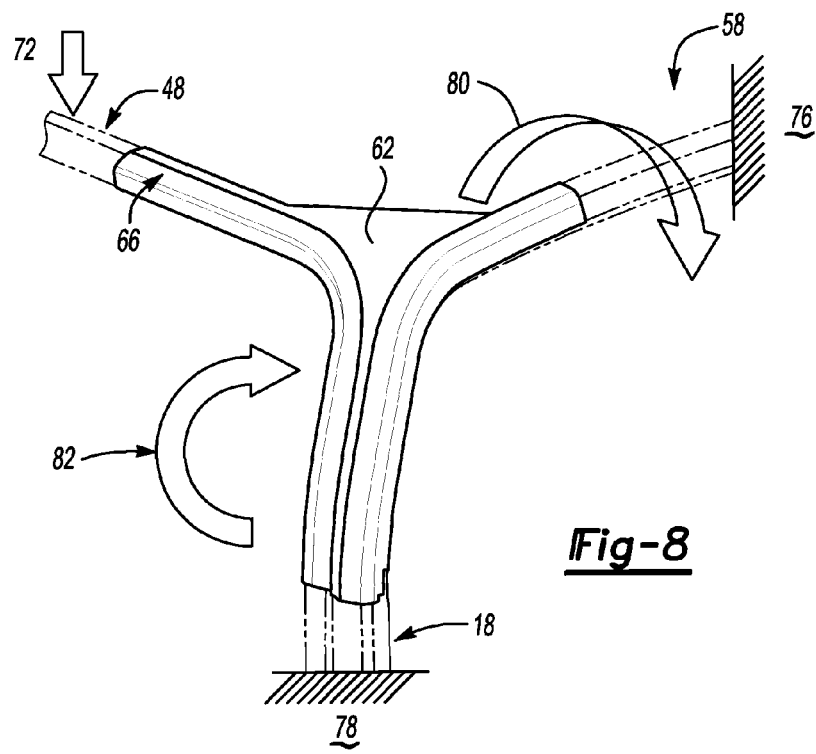
FIG. 8 is a free body diagram showing a load transfer strategy.

FIG. 8 is a free body diagram of one upper rear C-pillar corner. The rear header 58, as described above, extends transversely along the rear edge of the roof, connecting the right and left C-pillars 18. Because the test is applied to one side or the other of a vehicle, the distal side is generally unloaded and intact. The rear header 58 may behave as a simple cantilevered beam, grounded on the distal side 76 opposite where force 72 is applied. The rear cap 62 is intended to be directly loaded through its forward extension receptacle 66, and allow transfer of forces onto the rear header 58. The loaded side of the vehicle may impart a torsion moment, twisting the rear header 58. A particular aspect of the disclosed embodiment is to transfer the roof crush force 72 into a torsion load upon the rear header 58 structure. An opposing torsional resistance moment 80 is provided by the rear header 58, improving overall roof crush resistance.

A further aspect of the disclosed embodiment is to additionally transfer the roof crush loads into a bending load on the rear pillar structure. The structure of C-pillar 18 is generally vertical and connects the lower vehicle structure to the roof structure. Referring to the free body diagram FIG. 8, the C-pillar 18 tends to behave as a simple cantilevered beam as force 72 is applied toward the front of the vehicle. The simulated cantilevered beam is grounded at the lower structure 78 of the vehicle. However, the C-pillar 18 receives the roof force 72 differently than the rear header 58. The load transferred from the front of the vehicle through the rear cap 62 activates a resistant bending moment 82 from the C-pillar 18. Structural integrity of the C-pillar 18 thereby contributes to roof crush performance under this load path scheme. The strategy of combining the two above mentioned structures as cooperating cantilevered beams may dramatically improve roof crush performance without the presence of a B-pillar.

Figure 9:
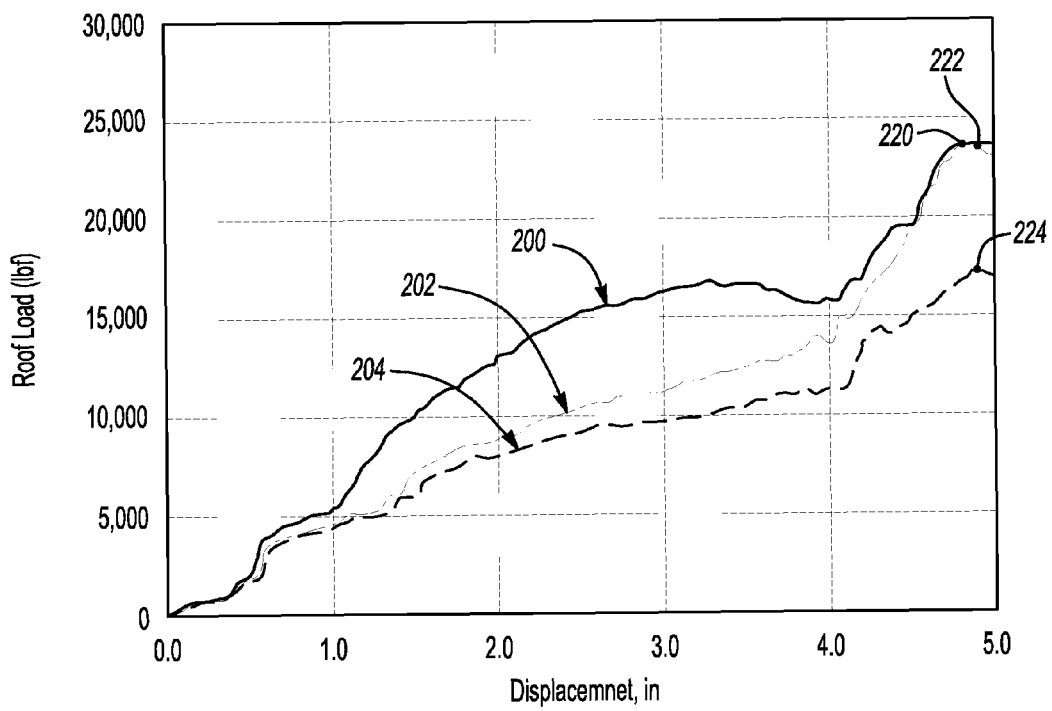
FIG. 9 is one example of a graph of results from a simulated roof test showing strength performance advantages of the disclosed embodiment.

FIG. 9 shows a load versus deflection plot from a simulated roof strength test. Three scenarios are shown. Curve 200 represents a prior art base model having a B-pillar, and meeting the roof strength requirement. Point 220 highlights a peak load achieved for the base model of approximately 23,000 pounds of force (102,309 newtons). Curve 204 represents an intermediate model where the B-pillar was eliminated with no other upgrades. A significant structural degradation occurred, only achieving a peak load of approximately 17,000 pounds of force (75,620 newtons). Point 224 denotes the peak load achieved in the intermediate model. A peak load reduction of over 28% exemplifies the role that a B-pillar typically plays in roof crush resistance. Curve 202 represents one example of the disclosed embodiment, where the B-pillar has been eliminated, and the C-pillar structure augmented as outlined above. The peak load achieved is equivalent to that of the base model having a B-pillar. Point 222 highlighting the peak load achieved by this exemplary embodiment essentially overlaps the peak load Point 220 of the base model. An estimated mass savings of 11 pounds (5 kilograms) was achieved through eliminating the structure of the B-pillar in this example.

The shapes of the load displacement curves also show the mechanics of how engaging a rear pillar structure may improve roof crush performance. The proposed invention performs much like the intermediate model with no B-pillar during the initial loading range of less than 10,000 pounds of force (44,482 newtons). In contrast, the base model with a center pillar has higher initial stiffness because of the early column loading resistance of the B-pillar. As the simulated steel plate intrudes into the structure, the load increases further and the difference in performance between the intermediate model with no B-pillar and the exemplary embodiment becomes more apparent. Higher resistance is provided when the rear structure begins to engage, limiting intrusion of the steel plate of a test fixture. The slope of load-deflection curve 202 changes, becoming steeper at about 15,000 pounds of force (66,723 newtons). This change reflects increased stiffness properties. Curve 202, representing to the exemplary embodiment, converges in the higher load ranges with curve 220 representing the prior art structure with a B-pillar. The exemplary embodiment achieves equal peak load strength having less overall structure. The enhanced rear structure in the exemplary model is shown to assume approximately 9,000 pounds of force (40,033 newtons), or 39% of the peak load sustained by the body structure in a roof crush event.

An alternative enhancement to gain further strength increase is to utilize an additional inner cap on the opposing inner side of the tube sections. An inner cap reinforcement may also allow even quicker engagement of the rear structure during roof crush. Although some cost and weight advantages are negated by the addition of parts, incremental strength may be obtained, while maintaining an objective of meeting roof strength with no center B-pillar.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various embodiments may be combined to form further embodiments of the invention.

What is claimed is:

1. A roof structure for a vehicle comprising:
    a left rear pillar and a right rear pillar, each being spaced from a left front pillar and right front pillar, respectively, wherein the front and rear pillars are the sole vertical support for the roof structure;
    a left roof rail and a right roof rail, each extending longitudinally along opposing side edges of a roof panel, wherein the left roof rail connects the left front pillar to the left rear pillar, and the right roof rail connects the right front pillar to the right rear pillar;
    a rear arch-like header extending transversely along a rear edge of the roof panel, connecting the left rear pillar to the right rear pillar; and
    a left upper cap and a right upper cap, each define three receptacles that each receive one of the roof rails, the rear pillars, and the rear header.

2. The roof structure according to claim 1, wherein the right roof rail, left roof rail, rear header, left rear pillar, and right rear pillar are of hollow tubular members.

3. The roof structure according to claim 2, wherein the left upper cap and the right upper cap each wraps an outer surface of each of the left and right roof rails, the rear header structure, and the left and right rear pillars.

4. The roof structure according to claim 1, wherein the left and right upper caps are welded to the rear pillars.

5. The roof structure according to claim 1, wherein downward forces applied to a forward portion of the roof panel are transferred as a torsional moment load on the rear header.

6. The roof structure according to claim 1, wherein downward forces applied to the a forward portion of the roof panel are transferred as a bending moment load on at least one of the left rear pillar or right rear pillar.

7. The roof structure according to claim 1, that is tested in a roof test fixture having a load plate that engages a front portion of the roof structure, and the load plate extends over the roof to an intermediate location, wherein the roof structure further comprises each of the left and right upper caps extend forward in the vehicle at least to the intermediate location to receive loads directly from the load plate.

8. A body structure for a vehicle comprising:
    a roof panel;
    left and right continuous tubular supports, each having a forward section extending vertically, a middle section extending longitudinally along the roof panel, and a rear section extending vertically defining left and right rear pillars, respectively;
    a continuous rear tubular support having a left section extending vertically along the left rear pillar, an upper section extending transversely along a rear edge of the roof panel defining a rear header, and a right section extending vertically along the right rear pillar;

a left upper cap that has three receptacles, wherein one receptacle couples the rear section of the left tubular support to the left section of the rear tubular support; and a right upper cap that has three receptacles, wherein one receptacle couples the rear section of the right tubular support to the right section of the rear tubular support.

9. The body structure according to claim 8, wherein the left upper cap and right upper cap are joined to the upper section of the rear tubular support.

10. The body structure according to claim 8, wherein the left upper cap wraps outer surfaces of the left tubular support and rear tubular support, and the right upper cap wraps outer surfaces of the right tubular support and rear tubular support.

11. The body structure according to claim 10, wherein the left upper cap is adhesively bonded to the left tubular support and the rear tubular support, and the right upper cap is adhesively bonded to the right tubular support and the rear tubular support.

12. The body structure according to claim 10, wherein the left upper cap is welded to the left tubular support and the rear tubular support, and the right upper cap is welded to the right tubular support and the rear tubular support.

13. The roof structure according to claim 8, that is tested in a roof test fixture having a load plate that engages a front portion of the roof structure, and the load plate extends over the roof to an intermediate location, wherein the roof structure further comprises each of the left and right upper caps extend forward in the vehicle at least to the intermediate location to receive loads directly from the load plate.

14. The body structure according to claim 8, wherein downward forces applied to a forward portion of the roof panel are transferred into a torsional moment load on the rear header.

15. The body structure according to claim 8, wherein downward forces applied to the a forward portion of the roof panel are transferred into a bending moment load on at least one of the left rear pillar or right rear pillar.

16. A roof structure for a vehicle comprising:

left and right continuous tubular supports, each having a forward section extending vertically, a middle section extending longitudinally along a roof panel, and a rear section extending vertically defining left and right rear pillars, respectively;

a rear arch-like tubular support joined to both the left and right rear pillars; and upper caps that couple the rear arch-like tubular support to both left and right continuous tubular supports.

17. The roof structure according to claim 16, wherein the rear arch-like tubular support further comprises a left rear pillar section, a rear header section, and a right rear pillar section that are all portions of a single continuous tube structure.

18. The roof structure according to claim 16, wherein downward forces applied to a forward portion of the vehicle roof structure are transferred into a torsional moment load on the rear arch-like tubular support.

19. The roof structure according to claim 16, wherein downward forces applied to the a forward portion of the vehicle roof structure are transferred into a bending moment load on at least one of the left rear pillar or right rear pillar.

* * * * *